United States Patent
Ponnavaikko et al.

(10) Patent No.: US 9,319,283 B2
(45) Date of Patent: Apr. 19, 2016

(54) SYSTEMS AND METHODS FOR CREATING WEB SERVICE COMPOSITIONS

(75) Inventors: Kovendhan Ponnavaikko, Tamil Nadu (IN); Ramsés V. Morales, Sunnyvale, CA (US)

(73) Assignee: Xerox Corporation, Norwalk, CT (US)

(*) Notice: Subject to any disclaimer, the term of this patent is extended or adjusted under 35 U.S.C. 154(b) by 405 days.

(21) Appl. No.: 13/405,416

(22) Filed: Feb. 27, 2012

(65) Prior Publication Data

US 2013/0227147 A1    Aug. 29, 2013

(51) Int. Cl.
G06F 17/30 (2006.01)
H04L 12/24 (2006.01)

(52) U.S. Cl.
CPC ........ H04L 41/5083 (2013.01); H04L 41/5045 (2013.01)

(58) Field of Classification Search
CPC .............. H04L 67/16; H04L 29/12113; H04L 61/1541; H04L 67/02; H04L 45/00; H04L 49/35; H04L 65/1016; H04L 67/28; H04L 67/2823; H04L 67/327; H04L 67/12; H04L 69/329; G06Q 40/00; G06Q 40/04; G06Q 30/02; G06Q 40/06
USPC .......... 707/104, 760, 809; 709/227–229, 223, 709/224, 202, 203, 230, 231, 232, 238, 246, 709/217
See application file for complete search history.

(56) References Cited

U.S. PATENT DOCUMENTS

| | | | |
|---|---|---|---|
| 6,847,974 B2 * | 1/2005 | Wachtel ........................ | 717/143 |
| 7,099,885 B2 * | 8/2006 | Hellman et al. | |
| 8,140,680 B2 * | 3/2012 | Behrendt et al. .............. | 709/226 |
| 2002/0173971 A1 * | 11/2002 | Stirpe et al. ........................ | 705/1 |
| 2003/0163450 A1 * | 8/2003 | Borenstein et al. .... | 707/999.001 |
| 2003/0217044 A1 * | 11/2003 | Zhang ..................... | G06F 9/546 |
| 2004/0054690 A1 * | 3/2004 | Hillerbrand et al. ........ | 707/104.1 |
| 2005/0021707 A1 * | 1/2005 | Fendt ........................ | H04Q 3/00 709/223 |
| 2005/0049924 A1 * | 3/2005 | DeBettencourt et al. ....... | 705/21 |
| 2006/0206348 A1 * | 9/2006 | Chen ..................... | G06Q 10/06 705/7.11 |
| 2006/0206440 A1 * | 9/2006 | Anderson et al. ............. | 705/500 |
| 2006/0225064 A1 * | 10/2006 | Lee ......................... | G06F 9/465 717/168 |
| 2010/0153426 A1 * | 6/2010 | Kim et al. ...................... | 707/765 |
| 2011/0179007 A1 * | 7/2011 | Shi ................................. | 707/706 |
| 2011/0270842 A1 * | 11/2011 | Dettinger et al. ............. | 707/805 |
| 2013/0091090 A1 * | 4/2013 | Spivack et al. ................ | 707/608 |

FOREIGN PATENT DOCUMENTS

WO    WO 2008015417    *    2/2008    ............. G06F 17/30

OTHER PUBLICATIONS

Pautasso, C.: Composing RESTful services with JOpera. In: International Conference on Softwareware Composition 2009. vol. 5634., Springer (Jul. 2009) 142-159.

(Continued)

*Primary Examiner* — Oleg Survillo
*Assistant Examiner* — Linh T Nguyen
(74) *Attorney, Agent, or Firm* — MH2 Technology Law Group, LLP

(57) ABSTRACT

Exemplary embodiments provide systems and methods for connecting services, including web services, using intermediate data exchange objects to create composition services. Data exchange objects may be service independent objects that represent the inputs and/or outputs of various services. The systems and methods may employ data exchange objects to determine whether two services are composable and to implement and execute composite services according to the data exchange objects.

9 Claims, 8 Drawing Sheets

(56) References Cited

OTHER PUBLICATIONS

Website: Yahoo Pipes. http://pipes.yahoo.com/pipes/ (2010). accessed Feb. 16, 2012.

Khalaf, R., Mukhi, N., Weerawarana, S.: Service-oriented composition in bpel4ws. In: WWW (Alternate Paper Tracks). (2003).

Ankolekar, A., Burstein, M.H., Hobbs, J.R., Lassila, O., Martin, D.L., McIlraith, S.A., Narayanan, S., Paolucci, M., Payne, T.R., Sycara, K.P., Zeng, H.: Daml-s: Semantic markup for web services. In: SWWS. (2001) 411-430.

Ponnekanti, S.R., Fox, A.: Sword: A developer toolkit for web service composition. In: Proceedings of the 11th International WWW Conference (WWW2002). (2002).

McIlraith, S.A., Son, T.C.: Adapting Golog for Composition of Semantic Web Services. In: Proceedings of the Eighth International Conference on Knowledge Representation and Reasoning (KR2002). (2002).

Website: FluidDB. http://fluidinfo.com/ (2010).

* cited by examiner

| CHARACTERISTIC | VALUE | EXAMPLE |
|---|---|---|
| PARENT SERVICE NAME AND DESCRIPTION | NAME OF THE PARENT SERVICE AND ITS DESCRIPTION. NAME OF THE WEBSITES/COMPANIES THAT EXPOSE THEIR DATA/RESOURCES USING AN API | TWITTER API: TWITTER API SUPPORTS METHODS TO SEND AND RECEIVE TWITTER DATA. |
| API METHOD NAME AND DESCRIPTION | NAME OF THE API METHOD AND ITS DESCRIPTION. EACH OF THE METHODS SUPPORTED BY THE API HAS ITS OWN DEFINITION. IN VARIOUS EMBODIMENTS, WHICH MAY MAINTAIN A ONE-TO-ONE MAPPING AMONG THE FIELDS OF THE SERVICE DEFINITION. IN SUCH EMBODIMENTS, EACH METHOD MAY BE TREATED AS AN INDIVIDUAL WEB SERVICE. | TWITTER STATUS UPDATE: UPDATES THE AUTHENTICATING USER'S STATUS. REQUIRES THE STATUS PARAMETER SPECIFIED BELOW. REQUEST MUST BE A POST. A STATUS UPDATE WITH TEXT IDENTICAL TO THE AUTHENTICATING USER'S CURRENT STATUS WILL BE IGNORED TO PREVENT DUPLICATES. |
| STATIC URL | THE STATIC PORTION OF THE URL. THIS PORTION OF THE URL REMAINS THE SAME FOR EVERY CALL. | HTTP://API.TWITTER.COM/1/STATUSES/UPDATE.XML |
| DYNAMIC URL | THE DYNAMIC PORTION OF THE URL. THIS PORTION OF THE URL CAN BE DIFFERENT FOR DIFFERENT CALLS. THE QUERY STRING HOWEVER IS NOT PART OF THE DYNAMIC URL. | IN YAHOO BOSS API, THE WEB SEARCH URL IS OF THE FORM HTTP://BOSS.YAHOOAPIS.COM/YSEARCH/WEB/V1/SEARCH_PHRASE. HERE, SEARCH_PHRASE FORMS THE DYNAMIC PORTION OF THE URL. |
| HTTP METHOD | THE HTTP METHOD USED: GET / PUT / POST / DELETE | THE POST METHOD MUST BE USED FOR TWITTER STATUS UPDATES. |
| AUTHENTICATION | CLIENT AUTHENTICATION MECHANISM USED: NONE / KEY / BASIC / OAUTH / ... | BASIC (USERNAME AND PASSWORD) AND OAUTH AUTHENTICATIONS CAN BE USED FOR TWITTER STATUS UPDATES. |

| | CHARACTERISTIC | VALUE | EXAMPLE |
|---|---|---|---|
| 250 | QUERY STRING ENCODING | ENCODING USED FOR THE QUERY STRING PARAMETERS: URL / UTF-8 / ASCII ... | URL ENCODING IS USED FOR TWITTER STATUS UPDATES. |
| 255 | BODY ENCODING | ENCODING USED IN THE BODY OF THE MESSAGE: URL / UTF-8 / ASCII ... | |
| 260 | REQUEST PARAMETERS, REQUIREMENTS AND DETAILS | TUPLES OF PARAMETER NAMES, WHETHER THEY ARE OPTIONAL OR REQUIRED, AND THEIR STRUCTURE / DESCRIPTION: ((STRING, OPTIONAL/REQUIRED, STRING)) | FOR TWITTER STATUS UPDATES: "{(STATUS, REQUIRED, THE TEXT OF YOUR STATUS UPDATE. URL ENCODE AS NECESSARY. STATUSES OVER 140 CHARACTERS WILL CAUSE A 403 ERROR TO BE RETURNED FROM THE API...), (IN_REPLY_TO_STATUS_ID, OPTIONAL,...), (LAT, OPTIONAL,...), (LONG, OPTIONAL,...), (PLACE_ID, OPTIONAL,...), (DISPLAY_COORDINATES, OPTIONAL,...)}" |
| 265 | REQUEST BODY TYPE AND DETAILS | SYNDICATION FORMAT OF THE REQUEST BODY AND THE STRUCTURE/DESCRIPTION OF THE CONTENTS: (IMT / HTML / XML / JSON / RSS / ATOM /..., STRING) | |
| 270 | RESPONSE BODY TYPE AND DETAILS | SYNDICATION FORMAT OF THE RESPONSE BODY AND THE STRUCTURE/DESCRIPTION OF THE CONTENTS : (IMT / HTML / XML / JSON / RSS / ATOM /..., STRING) | FOR TWITTER TRENDS: {"TRENDS" :[{"NAME" :"...", "URL" :"..."},...], "AS_OF" :"..."}"; FOR YAHOO BOSS WEB SEARCH {"TYPE" : "XML", "XMLNAMESPACE" : "HTTP://WWW.INKTOMI.COM/", "RESPONSEBODYENCODING" : "UTF8"} |
| 275 | OUTPUT DEO(S) | NAME OF THE DEO(S) | |

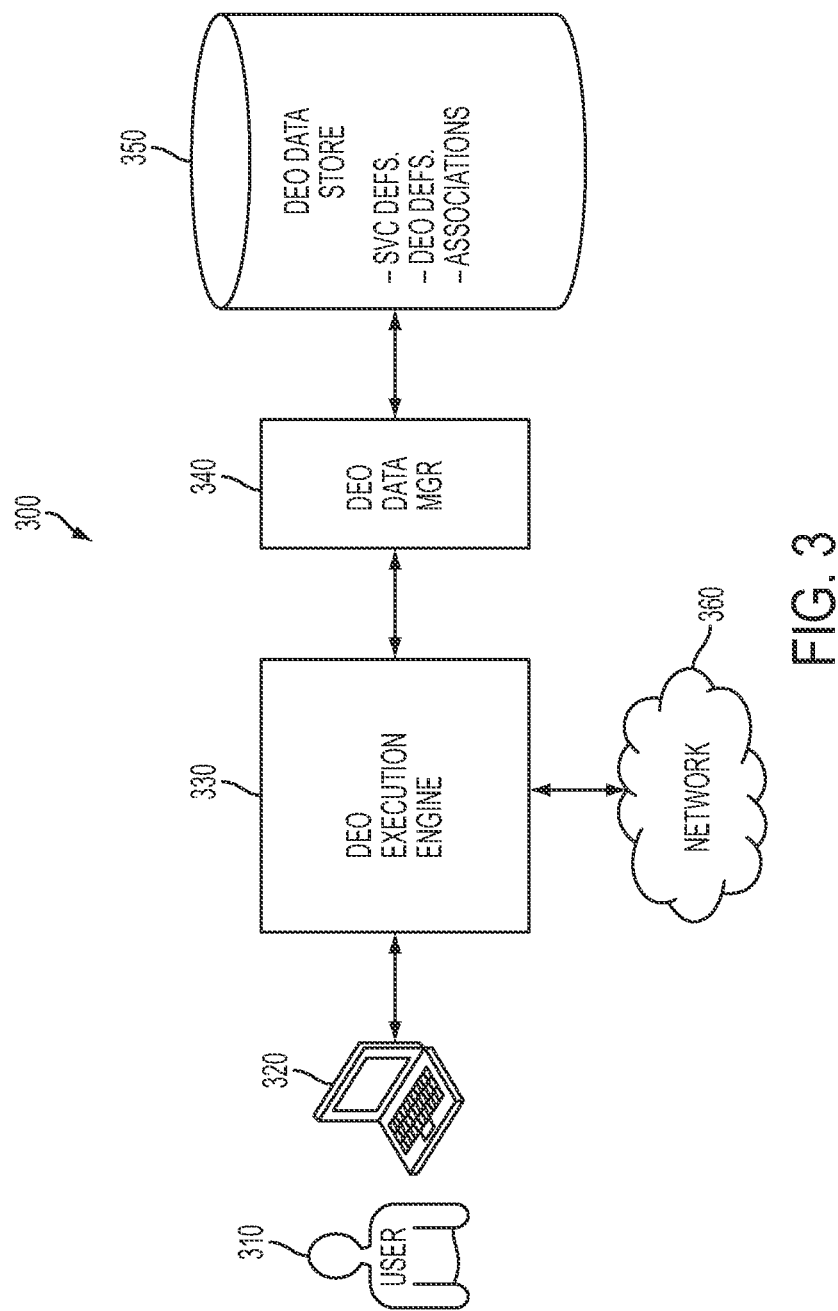

SYSTEMS AND METHODS FOR CREATING WEB SERVICE COMPOSITIONS

FIELD OF THE INVENTION

This disclosure relates to connecting services, and more particularly, to connecting web services using a data exchange object.

BACKGROUND

Recent years have witnessed increasing interest in creating and using widely accessible services, including web services implemented using representational state transfer (REST) style architectures. Unlike the heavy-weight Simple Object Access Protocol (SOAP)-based standards, RESTful services are loosely coupled and simpler to handle for developers and users alike. The large numbers of RESTful services and the simple interfaces have enabled the creation of mashups of multiple services to serve diverse purposes.

Making or forming a new composition service by combining or connecting multiple individual services, however, is time consuming and difficult due to the syntactic and semantic differences of the individual services. As a result, skilled users with programming knowledge are generally needed to build a composition of services or applications from multiple web-services. Typically, the composition of RESTful web services requires considerable programming effort. In order to get heterogeneous services to work together, skilled users must write adaptors to handle the difference in data encoding schemes (ASCII, URL, UTF-8, etc.), the conversion of formats (JSON, XML, PHP, etc.), and communication protocol differences (SOAP, REST, etc.). And, semantically relating heterogeneous services requires perhaps more significant skilled effort.

Solutions such as JOpera, and Yahoo Pipes allow programmers to use a GUI to create a workflow of services and connect the corresponding input and output attributes. However, the programmers are also required to provide adaptors required to couple pairs of services by handling the differences in terms of data encoding and formats. Moreover, such GUI based orchestration engines typically provide no hint to the developers regarding the composability of services in the first place—i.e., whether it is semantically possible to interconnect them. In such systems, developers must learn the working details of the different services to determine whether they can be used together. Another example is the BPEL4WS standard which is used for the static composition of services. This standard too does not support the discovery of possible compositions on demand.

There is ongoing research into using semantic web service languages, AI planning, rule-based plan generation, and situation calculi, for automating the composition of available services to fulfill user requirements. Despite several efforts in these areas, there is no tool that lay users without programming skills can use to generate service compositions.

Semantic and syntactic differences between services not only make it difficult to program or automate the composition of a set of services, they also make it difficult to realize that two disparate services can be used together, especially in unforeseen conditions. For example, consider a composition where the output of an MP3 encoder service is used as the input for a picture framer service. To a non-programmer, this composition does not seem to make sense and may be considered unworkable because the two services seem semantically incompatible. By considering in detail, however, the application programming interfaces (APIs) of these two services, a person that understands software would find that the MP3 encoder outputs a JPG file (among other data) that represents the artwork for the encoded sound track, and the picture framer can accept a JPG file to then frame it.

In addition to difficulties in determining whether the interfaces of two services are compatible, services, especially web services are always evolving and changing their APIs, thus potentially becoming incompatible with the applications or services that use them. Keeping track of these changes, while avoiding any coupling between services, compositions, and applications built from a particular composition is challenging.

The present disclosure provides several novel improvements to current service composition techniques, including improvements that enable lay users to connect web services easily and efficiently, without any programming knowledge.

BRIEF DESCRIPTION OF THE DRAWINGS

The accompanying drawings, which are incorporated in and constitute a part of this specification, illustrate embodiments of the invention and together with the description, serve to explain the principles of the invention. Wherever convenient, the same reference numbers have been used to refer to the same or similar components. In the figures:

FIGS. 2A and 2B illustrate an exemplary organization structure for storing a definition of a web service, consistent with embodiments of the invention;

FIG. 3 is a block diagram of an exemplary system for creating and managing data exchange objects and web service compositions, consistent with embodiments of the invention;

DESCRIPTION OF EMBODIMENTS

In general, embodiments consistent with the present disclosure provide systems and methods that may be used to democratize the process of creating complex compositions out of simple services. Simplifying the process of service composition may help to quickly increase the breadth of the palette in service marketplaces, including web service marketplaces available in the Internet.

Systems and methods consistent with this disclosure may provide a framework that enables lay users with little or no programming knowledge to create new compositions from a set of existing services. Various embodiments may employ inputs obtained from users of the systems and methods for their evolution. In such embodiments, the systems and methods may evolve with inputs obtained from the community.

Various embodiments create, store, and utilize abstract intermediate object types, called Data Exchange Objects (DEOs), for representing data objects that are exchanged between services (e.g., web services), while being service independent. A DEO may represent any data object that is output by, or input to, a service, such a U.S. address DEO, a geocode DEO, an album record DEO, an online product DEO, etc. In various embodiments, a DEO may serve as an indirect connector of services. In various implementations, a user without any details of the I/O objects of two services may check for the composability (i.e., connectability or compatibility) of the services by searching for intermediate DEOs associated with both services. For example, if one of the possible outputs of a service (in part or in whole) can be mapped to a particular DEO, and that same DEO can be mapped to one of the possible inputs of another service, then those services can be connected, through the DEO, and thus composed.

Figure 1:
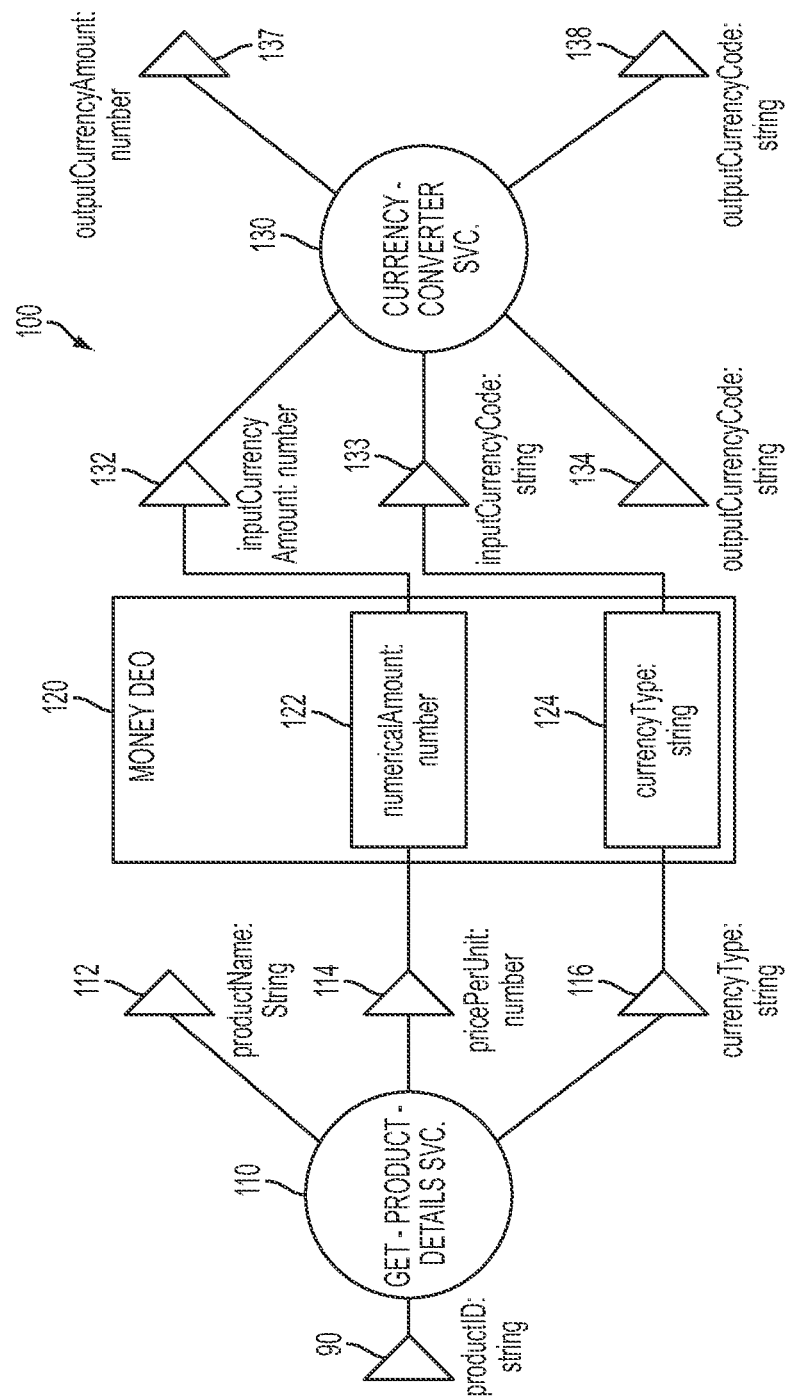
FIG. 1 is a block diagram of an exemplary system utilizing a data exchange object to connect services, consistent with embodiments of the invention.

FIG. 1 is a block diagram of an exemplary system 100 utilizing a data exchange object to connect services, consistent with embodiments of the invention. In the example shown, system 100 include a Get_Product_Details service 110, a Currency_Converter service 130, and a Money DEO 120 that connects the two services and models the service interfaces and the mapping between outputs of Get_Product_Details service 110 and inputs of Currency_Converter service 130.

In the example shown in FIG. 1, the Get_Product_Details service 110 accepts a productId input 90 and returns or outputs data object(s) (e.g., a JavaScript Object Notation (JSON) object) with details about the product in an online market, including productName output 112, pricePerUnit output 114, and currencyType output 116. In pseudocode, the outputs may be represented with a structure as follows:

```
{   "productName":"...",
    "pricePerUnit":...,
    "currencyType":"..." }.
```

As shown, the CurrencyConverter service 130 accepts an input JSON object(s) (e.g., a JSON object) specifying the currency that needs to be converted, including inputCurrencyAmount input 132, inputCurrencyCode input 133, and outputCurrencyCode input 134. In pseudocode, these inputs may be represented with a structure as follows:

```
{   "inputCurrencyAmount",
    "inputCurrencyCode":"...",
    "outputCurrencyCode":"..."... }.
```

CurrencyConverter service 130 returns the amount in the output currency according to current exchange rates in data object(s) such as outputCurrencyAmount output 137 and outputCurrencyCode output 138. Composition of these two services may be useful for a user who wants to know the current price of a product in his/her local currency type.

In various embodiments, a DEO may serve as an indirect connector of services. In the example shown in FIG. 1, the Money DEO 120 includes two attributes: a numericalAmount attribute 122 and a currencyType attribute 124.

In pseudocode, these attributes or members may be represented with a structure as follows:

```
{   "numericalAmount":...,
    "currencyType":"..." }.
```

As shown in the example of FIG. 1, two of the output members of the GetProductDetail service 110 (e.g., pricePerUnit output 114 and currencyType output 116) may be associated with or mapped to the Money DEO 120 (e.g., to the numericalAmount attribute 122 and the currencyType attribute 124, respectively. In additional, two of the input members of the CurrencyConverter service 130 may be associated with or mapped to the members of Money DEO 120 (e.g., InputCurrencyAmount input 132 may be mapped to numericalAmount attribute 122, and inputCurrencyCode input 133 may be mapped to currencyType attribute 124).

In pseudocode, the Money DEO 120 may be represented with a structure as follows:

```
{   "name":"Money",
    "structure":
    {   "numericalAmount":"",
        "currencyType":"" } }.
```

In some embodiments, DEOs may be implemented as structured data objects that follow a grammar similar to that of a JSON object. For example, the grammar used to generate DEOs may include:

```
object →    { } | { members }
members →   pair | pair , members
pair →      string : value
array →     [ ] | [ elements ]
element →   value | value , elements
value →     string | number | object | IMT | array | true | false | null.
```

Using this type of grammar, a DEO for representing the daily weather may be:

```
{   "name":"DailyWeather",
    "structure":
    {   "maximumTemperature":"",
        "minimumTemperature":"",
        "metric":"" }       }
```

In various embodiments, once a DEO, such as Money DEO 120 or the above-described DailyWeather DEO is created, a lay user may create a composition of the two services 110 and 130 without any knowledge of the intrinsic details of either service. In various embodiments, a user without any details of the I/O objects of two services may also check for the composability of services using intermediate DEO(s). If one of the possible outputs of a service (in part or in whole) can be mapped to a particular DEO, and that same DEO can be mapped to one of the possible inputs of another service, then those services can be connected, through the DEO, and thus composed. In various embodiments, a DEO may represent the input (or output) of a service if such a mapping exists.

In the example of FIG. 1, Money DEO 120 indicates to a user that Get_Product_Details service 110 and Currency_Converter service 130 are semantically compatibility to some degree, as Money DEO 120 specifies that the members pricePerUnit output 114 and currencyType output 116 of Get- ProductDetails service 110 are equivalent to the members inputCurrencyAmount input 132 and inputCurrencyCode input 133, respectively, of CurrencyConverter service 130. In the example shown, Money DEO 120 specifies this by mapping the same attribute to an output of Get_Product_Details service 110 and an input Currency_Converter service 130. For instance, pricePerUnit output 114 is mapped numericalAmount attribute 122, which is also mapped to inputCurrencyAmount input 132.

In various embodiments, the mapping or association between an input and/or output of a service and a DEO may be stored as part of the DEO itself, stored as part of the definition of each service, or stored separately.

Although the exemplary embodiments discussed, and the exemplary name "DEO" refers to representation of data objects, in other embodiments, DEOs may be used to represent storage elements, computing resources or elements (e.g., Amazon.com's simple storage service instances (S3™) or elastic compute cloud instances (EC2™)), and the like. Compositions which require access to online data stores and cloud instances may use such embodiments of DEOs to discover appropriate services and users may analyze their compatibilities using such DEOs.

Although the exemplary embodiments discussed have illustrated a single level of indirection between two services, other embodiments may mappings between two or more sets of DEOs. For example, if a service ServiceA returns a DEO DEO1 and a service ServiceB returns a DEO DEO2 and DEO DEO3 is derivable from the combination of DEOs DEO1 and DEO2, then the multiple levels of indirection DEO1 to DEO2 to DEO3 make connection of ServiceA to ServiceB possible, and the DEOs enable for a user to learn about the composability of service ServiceA with service ServiceB, via DEO DEO3.

In various embodiments, community participants (e.g., system users) may create and store DEOs, such as Money DEO 120, for use by other users, thus providing a composition framework regarding the equivalence of data members from different services. In various embodiments, a community of users may create large numbers of flatly structured intermediate DEOs to help connect services. This approach contrasts with approaches that involve using formal hierarchical domain-specific ontologies and maintaining associations between service I/O elements and the ontologies to analyze the equivalence of elements, which are complex and discourage popular adoption.

One of ordinary skill will recognize that elements may be added to, removed from, or modified within system 100 without departing from the principles of the invention. For example, systems consistent with the invention may have any number of services, inputs, outputs, and DEOs.

FIGS. 2A and 2B illustrate an exemplary organization structure 200 for storing a definition of a web service, consistent with embodiments of the invention. As shown, organization structure 200 includes a characteristics column 205 and a value column 210. The example shown also includes an example column 215, which is provided for clarity of explanation, and which would typically not be implemented in a data structure that stores the definition of a web service.

In the embodiment shown in FIGS. 2A and 2B, organization structure 200 lists set of characteristics of a service, such as a RESTful web service, which may be defined and stored in a data structure representing the service. As shown, in column 205, the characteristics that may be stored to represent a web service include "parent service name and description" 220, "API method name and description" 225, "Static URL" 230, "Dynamic URL" 235, "HTTP method" 240, "Authentication" 245, "Query String Encoding" 250, "Body Encoding" 255, "Request parameters, requirements, and details" 260, "Request body type and details" 265, "Response body type and details" 270, and "Output DEO(s)" 275.

Using these types of characteristics, a service definition for representing the Yahoo™ Build Your Own Search Service (BOSS) API may be configured as:

```
{   "root":"Yahoo BOSS",
    "service":"Web search",
    "urlStatic":"http://boss.yahooapis.com/ysearch/web/v1/",
    "requestEncoding":"url",
    "urlDynamic":{ "":"The query string." },
    "method":"GET",
    "authentication":{ "type":"key" },
    "queryString":
    [ {  "name":"appid",
         "value":"-appid-",
         "requirement":"mandatory",
         "mutable":"no" },
      {  "name":"format",
         "value":"xml",
         "requirement":"mandatory",
         "mutable":"no" },
      {  "name":"start",
         "value":"1",
         "requirement":"optional",
         "mutable":"yes" },
      {  "name":"count",
         "value":"3",
         "requirement":"optional",
         "mutable":"yes" } ],
    "responseBody":
    {   "type":"xml",
        "xmlNamespace":"http://www.inktomi.com/",
        "responseBodyEncoding":"utf8" },
    "outputDEOs":
    [ {  "deo":"SearchResults" } ] }
```

In this exemplary embodiment, the mapping or association between the output(s) of the service and one or more DEOs is stored along with the definition of the service, as illustrated by row 275 of data organization 200 and by the "outputDEOs" characteristic in the service definition above. In other embodiments, a mapping or association between the input(s) of the service and one or more DEOs may also be stored with the definition of a service. The mappings or associations between the inputs/outputs of a service and DEO(s) may also be stored in other ways.

In some embodiments, the service to DEO mapping information may include details about the equivalence of corresponding members of a service I/O object and a DEO. In various embodiments, information regarding the association between a DEO and the set of services that are associated with it is made accessible to a user, aiding the user in building compositions of services.

One of ordinary skill will recognize that fields may be added to, deleted from, modified, or reordered in data organization 200 without departing from the scope of the invention. For example, a row may be added to specify input DEOs that are associated with a service.

FIG. 3 is a block diagram of an exemplary system 300 for creating and managing data exchange objects and web service compositions, consistent with embodiments of the invention. As shown, system 300 includes a user 310, who utilizes a computer 320, such as a laptop computer, workstation, or desktop personal computer, to interface with a DEO execution engine 330. In various embodiments, computer 320 may include a services composition tool, program, or application, which communicates with DEO execution engine 330 and enables user 310 to create, store, and utilize Data Exchange Objects (DEOs), create store and utilize service definitions, and/or analyze, create and execute new compositions from a set of services.

In various embodiments, DEO execution engine 330 may be implemented as a software program or application running on computing system, such as a server. In various embodiments, DEO execution engine 330 may implement functions and operations that manage, query, and manipulate DEOs and service definitions and their associations. For example, DEO execution engine 330 may include functions and operations which enable user 310 via a client application on computer 320, to query a DEO data store 350 for appropriate services and DEOs, create and edit definitions and associations, build workflows, generate orchestration code and execute it. In some embodiments where the services employed are web services, DEO execution engine 330 may interact with, compose, and/or execute services that are accessible via a network 360, such as the Internet. In one specific exemplary embodiment, DEO execution engine 330 may implement the functionality associated with the controls shown on exemplary user interface 400 of FIG. 4 using a client-server model, where computer 320 is the client and DEO execution engine 330 is the server.

In the embodiment shown, any client application running on computer 320 may create and/or interact with stored DEO data and stored service data through the DEO execution engine 330. For example, a client application running on computer 320 such as a composite service execution module that passes data from one service to another service during execution may first query the service-to-DEO mappings, using the DEO execution engine 330, before implementing the data passing. In some embodiments, a client application running on computer 320 may also directly interface (not shown) with a DEO Data Manager 340 and/or the DEO Data Store 350 for functions not related to service and DEO definitions.

In the embodiment shown in FIG. 3, DEO execution engine 330 is operably connected to DEO Data Manager 340. In various embodiments, DEO Data Manager 340 controls the creation, maintenance, storage, and retrieval of information related to service composition functions and DEOs, which, in the embodiment shown is stored in DEO Data Store 350. In various embodiments, DEO Data Store 350 may store service and DEO definitions, as well as service-DEO and DEO-service associations or mappings.

In various embodiments, DEO Data Store 350 may be implemented as a networked, distributed, highly-available key-value data store, such as Hadoop's HBase™ data store, Amazon's SimpleDB™ data store, or the Cassandra™, Gizzard™ or Redis™ data stores, among others. In such embodiments, a pseudo data-base may be built on top of the key-value data store, as represented, for example, by DEO Data Manager 340, which may be responsible for a set of queries and operations on the data. As shown, DEO Data Manager 340 may provide an interface used by DEO Execution Engine 330 for interacting with the data in DEO Data Store 350. As mentioned, in some embodiments, DEO Data Manager 340 may also provide an interface used by client applications running on computer 320, such as a graphical services composition tool or the like.

In various embodiments wherein DEO Data Manager 340 and DEO Data Store 350 are implemented as a key-value data store, DEO Data Manager 340 may provide the following features and functions: (1) an interface that receives a unique key, and returns a unique value associated to that key, (2) an interface to create or update a value associated with a key, (3) high-availability, and (4) low-latency. Such embodiments, by virtue of (3) and (4), may easily scale with the number of key-value pairs stored.

In various embodiments, instead of a key-value data store, any other kind of data store may be used, such as a RDBMS with a SQL interface or the like, as no particular type of data store implementation is critical to the present disclosure.

In various embodiments, the service definitions, DEO definitions and associations or mappings among them may be generated and maintained by users, such as user 310, as humans may comprehend difficult-to-recognize connections and correlations between the APIs of services and between DEOs. In such embodiments, social collaborations may be leveraged to create and maintain large collections of DEO and service related data, similar to the data management platform FluidDB.

One of ordinary skill will recognize that the exemplary system 300 shown in FIG. 3 is necessarily simplified for conciseness and clarity of explanation, and that that elements and components may be added to, removed from, combined, or modified within system 300 without departing from the principles of the invention without departing from the scope of the invention. For example, computer 320 may be connected to DEO execution engine 330 via a network, such as network 360 (e.g., the Internet), and/or DEO execution engine 330 may also be connected to DEO Data Manager 240 via a network, such as network 360. For another example, system 300 may be implemented such that the functionality of DEO execution engine 330 and DEO Data Manager 240 are combined in a single program, application or server. For yet another example, DEO Data Store 350 may be implemented as multiple data stores, with the data distributed among them.

Figure 4:
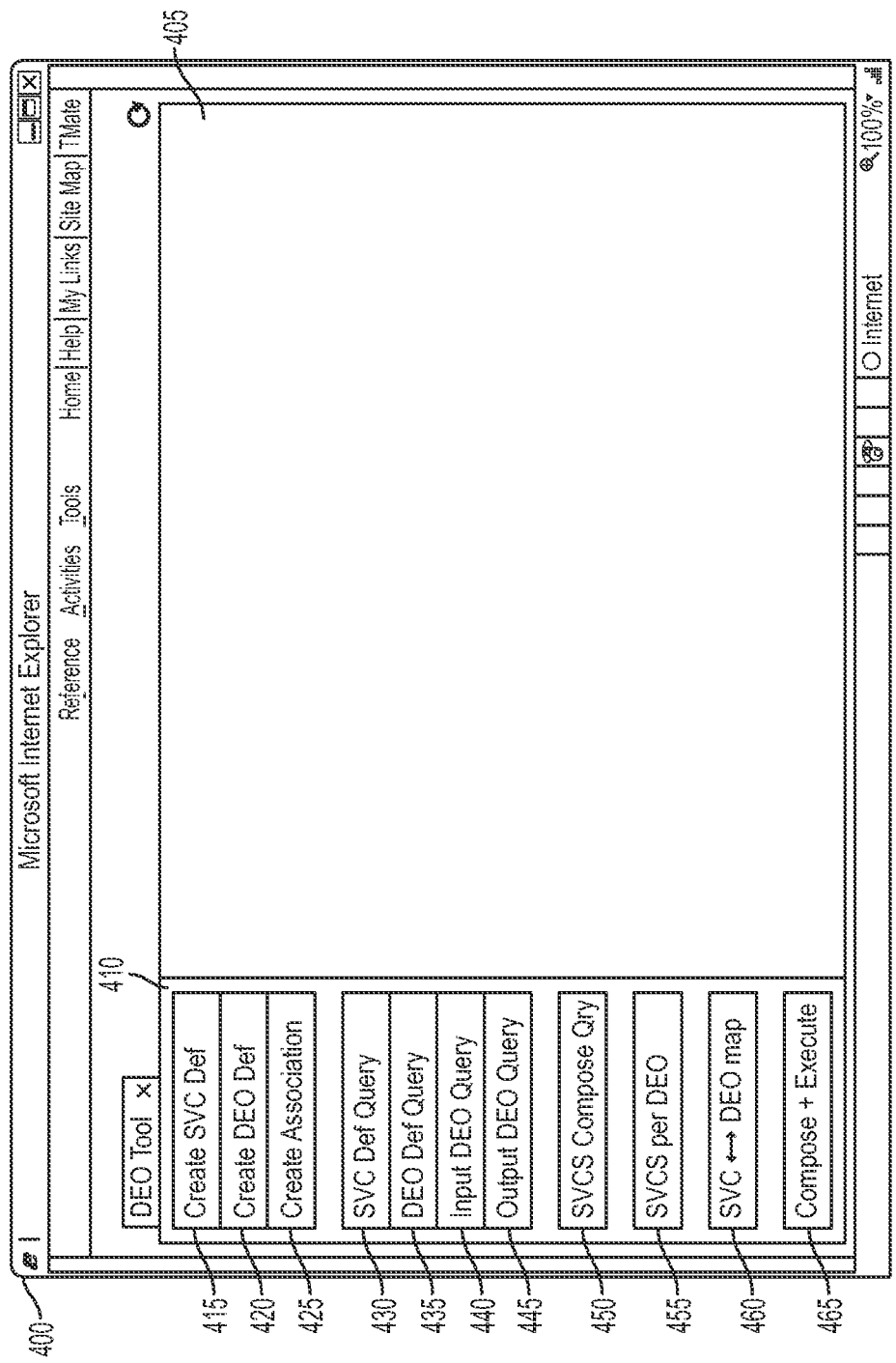
FIG. 4 is a depiction of an exemplary user interface for creating and managing data exchange objects and web service compositions, consistent with embodiments of the invention.

FIG. 4 is a depiction of an exemplary user interface 400 for creating and managing data exchange objects and web service compositions, consistent with embodiments of the invention. In various embodiments, user interface 400 may be a composition GUI in which users, such as user 310, may query a data store, (e.g., DEO data store 350) for appropriate services and DEOs, create and edit definitions and associations, build workflows, generate orchestration code for connecting the outputs and inputs of services and execute the code.

As shown, user interface 400 includes a controls area 410 and a work display area 405. Other arrangements are possible. A user who wishes to compose or connect two services, for example serviceA and serviceB, may employ the controls in controls area 410 and the displays in work display area 405 to determine: (1) whether serviceA can be composed with, or connected to serviceB (i.e., whether the services are syntactically compatible); and (2) which (if any) data objects link serviceA and serviceB (i.e., whether the services are semantically compatible).

Checking for syntactic compatibility primarily deals with verifying whether the outputs of one service can be used as inputs to the other service. For example, in order for serviceA to be composable with serviceB, the Internet Media Type (IMT) returned as output by serviceA must be acceptable as input by serviceB. For example, if serviceA returns images in JPEG format and serviceB accepts images of GIF format only, then serviceA and serviceB are not syntactically compatible because they cannot be directly connected.

Adaptors which handle the conversion of formats (JPEG, GIF, JSON, XML, PHP, etc.), the differences in data encoding schemes (ASCII, URL, UTF-8, etc.), and which address communication protocol differences (SOAP, REST, etc.) may be employed to make services syntactically compatible. In various embodiments, structured definitions for web services (see, for example, FIG. 2) may be employed as a means of checking for and enabling syntactic composability of services.

The controls and displays of user interface 400 enable a user to view and analyze the semantic differences and equivalences between input and output data objects of services. For instance, the query controls and resultant displays of service and/or DEO information allow a user to determine whether equivalent members are named differently in different services, whether the same name is used to represent entirely different members by different services, and the like, such that the user may determine whether services are semantically compatible.

In the exemplary embodiment shown, controls area 410 includes 11 controls 415-460. More or fewer controls may be used. The functionality of each exemplary control will be described using the conventions of the exemplary implementation described in the following paragraph.

Service "i" will be represented as $S_i$. DEO "j" will be represented as $D_j$. Each service has a globally unique ID, and each DEO has a globally unique ID. Those unique ids are hashed "H" (e.g., using SHA1) to determine their key "K" in the data store (e.g., DEO data store 550), and the keys are represented in the following way, $K(S_i)=H(S_i)$ and $K(D_j)=H(D_j)$. Let $O(S_i)$ be the set of DEOs that can be used to represent the output of service $S_i$, and $I(S_i)$ be the set of DEOs that can be used to represent the input of service $S_i$.

Create Service Definition control 415 allows a user to create or modify the definition of a service in work display area 405, and then store the service definition, for example in a data store such as DEO data store 350. In various embodiments, a created service definition may be assigned a unique ID, such as a number or a string $S_i$, and the unique ID may be used to store the service definition, for example, by hashing the unique ID (e.g., $H(S_i)$) and using the result (e.g., $K(S_i)$) as an index key into the data store. In some embodiments, the service definition may be stored in association with a timestamp indicating the date and time that the definition was last modified.

In various embodiments, a user may create or modify the definition of a service by modifying pseudo code, and/or graphical representations corresponding to features of the service, in work display area 405. For example, a user may use an editor to create and store a definition of a weather service as follows:

```
{   "root":"WebServiceX",
    "service":"Weather Service",
    "urlStatic":"http://www.webservicex.net/WeatherForecast.asmx/GetWeatherByZip Code",
    "requestEncoding":"url",
    "method":"GET",
    "authentication":{ "type":"none" },
    "queryString":
    [ { "name":"ZipCode",
        "value":"",
        "requirement":"mandatory",
        "mutable":"yes" ],
    "responseBody":
    {   "type":"xml",
        "xmlNamespace":"http://www.webserviceX.NET/",
        "responseBodyEncoding":"utf8" } }
```

An exemplary XML output of the weather service could be:

```
<?xml version="1.0" encoding="utf-8"?>
<WeatherForecasts xmlns:xsi="http://..." xmlns:xsd="http://..."
xmlns="http://... ">
<Latitude>43.2195625</Latitude>
<Longitude>77.461586</Longitude>
...
<Details>
<WeatherData>
<Day>Monday, May 03, 2010</Day>
<WeatherImage>http://... </WeatherImage>
<MaxTemperatureF>63</MaxTemperatureF>
<MinTemperatureF>53</MinTemperatureF>
<MaxTemperatureC>17</MaxTemperatureC>
<MinTemperatureC>12</MinTemperatureC>
</WeatherData>
</Details>
</WeatherForecasts>
```

In some embodiments, the output format of a service may also be created, modified, and stored by a user using user interface 400.

Create DEO Definition control 420 allows a user to create or modify the definition of a DEO in work display area 405, and then store the DEO definition, for example in a data store such as DEO data store 350. In various embodiments, a created DEO definition may be assigned a unique ID, such as a number or a string $D_j$, and the unique ID may be used to store the DEO definition, for example, by hashing the unique ID (e.g., $H(D_j)$) and using the result (e.g., $K(D_j)$) as an index key into the data store. In some embodiments, the DEO definition may be stored in association with a timestamp indicating the date and time that the definition was last modified.

In various embodiments, a user may create or modify the definition of a DEO by modifying pseudo code, and/or graphical representations corresponding to features of the DEO, in work display area 405. For example, a user may use an editor to create and store a definition of a DailyWeather DEO as follows:

```
{   "name":"DailyWeather",
    "structure":
    {   "maximumTemperature":"",
        "minimumTemperature":"",
        "metric":"" } }
```

Create Service Association control 425 allows a user to create or modify an association or mapping between an input/output of a service and an attribute, characteristic, or member of a DEO in work display area 405, and then store the association or mapping, for example in a data store such as DEO data store 350. In some embodiments, the association or mapping may be stored as part of a service definition or a DEO definition.

In various embodiments, a user may create or modify the definition of a service by modifying pseudo code, and/or graphical representations corresponding to features of the service, in work display area 405. For an example with respect to the "Weather Service" service definition and the "DailyWeather" DEO definition above, in some embodiments, a user may use an editor to create and store a mapping between the DailyWeather DEO and the output of WebServiceX APIs' weather service of the textual form:

```
DailyWeather.maximumTemperature ← →
    WeatherForecasts.Details.WeatherData.MaxTemperatureF
DailyWeather.minimumTemperature ← →
    WeatherForecasts.Details.WeatherData.MinTemperatureF
DailyWeather.metric ← → "Fahrenheit"
```

Figure 5:
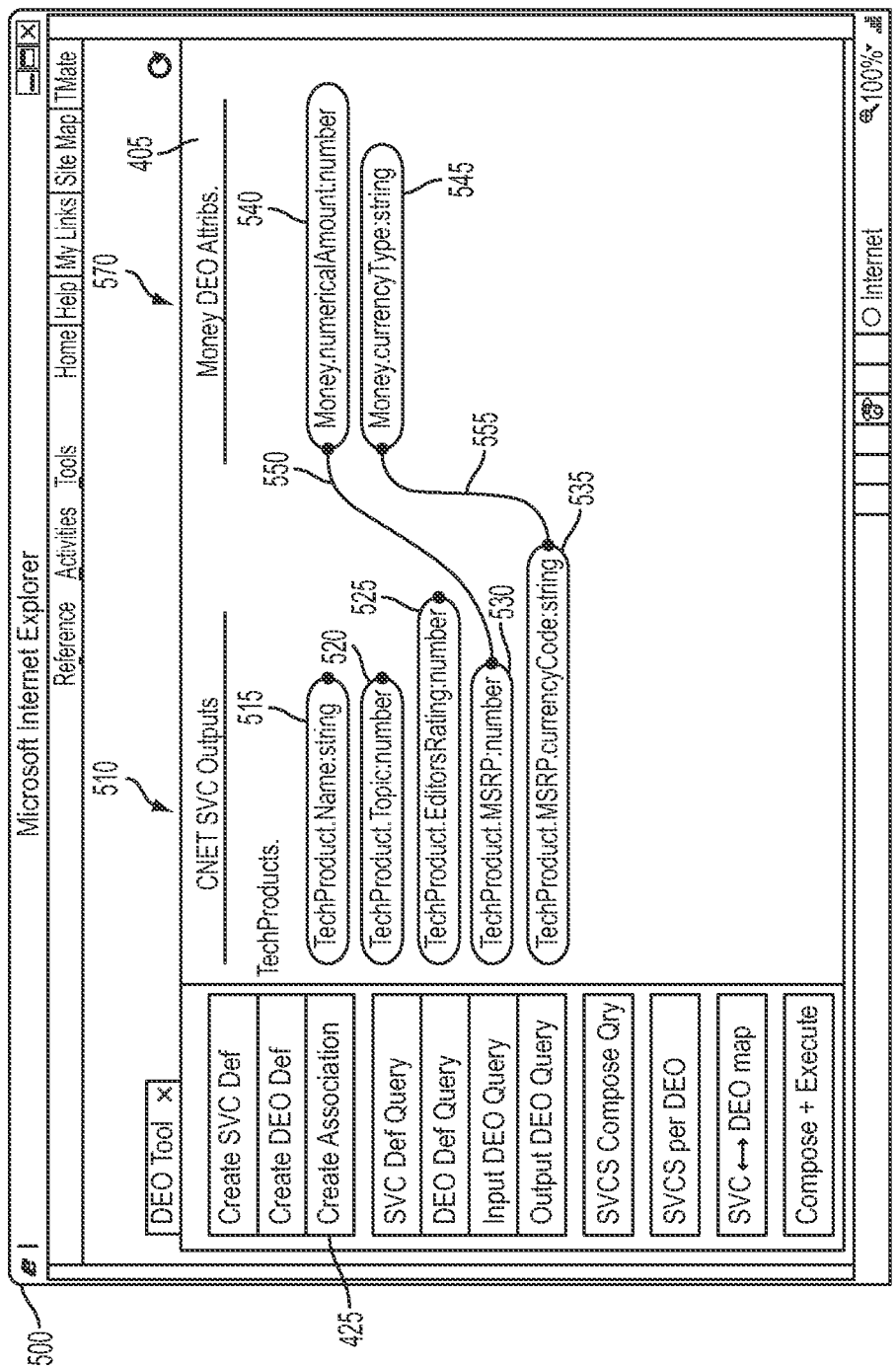
FIG. 5 is a depiction of another exemplary user interface for creating and managing data exchange objects and web service compositions, consistent with embodiments of the invention.

Referring for a moment to FIG. 5, there is depicted FIG. 5 an exemplary user interface 500 for creating and managing data exchange objects and web service compositions, consistent with embodiments of the invention. In the embodiment shown, a user has activated the Create Service Association control 425, and the system has created a graphical display in work display area 405 that allows the user to associate or map the outputs of a service named CNET service 510 to the attributes of DEO named Money 570 by drawing or dragging connectors 550 and 555 between the graphical representations of the service's outputs 515-535 and the DEO's attributes 540-545.

More specifically in this example, the user may have previously used the Create Service Definition control 415 or the Service Definition query control 430 to create and/or display a definition of CNET service 510, such as:

```
{  "root":"CNET",
   "service":"Product Search",
   "details":"Category Ids available at http://developer.cnet.com/docs/",
   "urlStatic":"http://developer.api.cnet.com/rest/v1.0/
   techProductSearch", "requestEncoding":"url",
   "method":"GET",
   "authentication":{ "type":"key" },
   "queryString":
   [ { "name":"categoryId",
       "value":"",
       "requirement":"mandatory",
       "mutable":"yes" },
     { "name":"query",
       "value":"",
       "requirement":"mandatory",
       "mutable":"yes" },
     { "name":"iod",
       "value":"",
       "requirement":"mandatory",
       "mutable":"yes" },
     { "name":"start",
       "value":"",
   "requirement":"mandatory",
   "mutable":"yes" },
     { "name":"results",
       "value":"",
       "requirement":"mandatory",
       "mutable":"yes" },
     { "name":"partTag",
       "value":"",
       "requirement":"mandatory",
       "mutable":"yes" ],
   "responseBody":
   {   "type":"xml",
       "xmlNamespace":"http://developer.api.cnet.com/rest/v1.0/ns",
       "responseBodyEncoding":"utf8" } };
```

Where in this example, an XML output of the CNET service may be:

```
<?xml version="1.0" encoding="utf-8"?>
<CNETResponse realm="cnet" version="1.0"
xmlns="http://..." xmlns:xlink="http://... ">
<TechProducts start="0" numReturned="1" numFound="277" >
<TechProduct id="33770783" xlink:href="http://... ">
<Name>Apple iPod Touch (third generation, 64GB)</Name >
<Topic id="" ></Topic>
<EditorsRating outOf="10" >9.0</EditorsRating>
<MSRP>399.00</MSRP>
<currencyCode>$</currencyCode >
<Offers start="0" numReturned="0" numFound="8"/>
</TechProduct>
</TechProducts>
</CNETResponse>
```

Similarly, for this example, the user may have previously used the Create DEO Definition control 415 or the DEO Definition query control 430 to create and/or display a definition of Money DEO 570, such as:

```
{   "name":"Money",
    "structure":
    {   "numericalAmount":"",
        "currencyType":"" } };
``` or as shown in FIG. 1 in graphical format.

In some embodiments (not shown), the definition of the subject service(s) and DEO(s) may be displayed in work display area 405 of FIG. 5, (for example, in the lower portion of work display area 405), at the same time as the mapping connections 550, 555 between the service(s) and the DEO(s). Other techniques for presenting the relevant information to the user may also be used.

Using the information from the service definition(s) and the DEO definition(s), the user may determine the semantic compatibility or equivalence between service inputs/outputs and DEOs, and create mappings or associations between them. As shown in FIG. 5, the user has determined that the CNET.TechProducts.TechProduct.MSRP output 530 of CNET service 510 is semantically equivalent to the Money.numericalAmount attribute 540 of Money DEO 570, and associated or mapped the two together, as represented by graphical connector 550. Similarly, the user has determined that the CNET.TechProducts.TechProduct.MSRP.currencyCode output 535 of CNET service 510 is semantically equivalent to the Money.currencyType attribute 545 of Money DEO 570, and associated or mapped the two together, as represented by graphical connector 555. In various embodiments, the system may automatically check whether the inputs/outputs and attributes which a user associates with each other are also syntactically equivalent, and if not, employ an appropriate adaptor to resolve syntactic differences.

Some services may include a single output (or input) data object may contains subparts or portions of information that map to two or more DEO attributes, and vice versa. For such situations, various embodiments may provide functions (e.g. a source code subprogram or module) to separate the subparts and associate each with the appropriate DEO attribute, or vice versa. For example, if, unlike the example above, the returned XML object of the CNET service 510 included the element TechProducts.TechProduct.MSRP 530 having a string value that specified both the amount of money and the type of currency, such as "$399.00," then the system may separate the currency symbol and the numerical value, using a regular expression such as "\$([\d\.,]+)\s*" so as to map between the numerical portion of the CNET service output (i.e., "399.00") and the Money.numericalAmount attribute 540 of Money DEO 570: CNET.TechProducts.TechProduct.MSRP Money.numericalAmount.

In various embodiments, after a user has finished creating Service to DEO associations, the system may save the associations using a key-indexed storage scheme, as described below.

One of ordinary skill will recognize that the exemplary user interface shown in FIG. 5 is necessarily simplified for conciseness and clarity of explanation, and that information and controls may be rearranged or presented differently without departing from the scope of the invention.

Referring again to FIG. 4, Service Definition Query control 430 allows a user to find and display a service definition(s) in work display area 405. For example, upon activation of Service Definition Query control 430, the system may prompt the user for the name and/or unique ID of the service (or generate the unique ID from the name), and then use the name or unique ID (e.g. $S_i$) to retrieve the corresponding service definition from a data store, such as DEO data store 350. In some embodiments, a key, for example as defined above for service $S_i$, may be computed and sent to the data store, and the data store may return the service definition that is retrieved using the key. In some embodiments, the data store also may return a timestamp that specifies the latest modification time of the definition.

DEO Definition Query control 435 allows a user to find and display a DEO definition(s) in work display area 405. For example, upon activation of DEO Definition Query control 435, the system may prompt the user for the name and/or unique ID of the DEO (or generate the unique ID from the name), and then use the name or unique ID (e.g. $D_j$) to retrieve the corresponding DEO definition from a data store, such as DEO data store 350. In some embodiments, a key, for example, as defined above for DEO $D_j$, may be computed and sent to the data store, and the data store may return the DEO definition that is retrieved using the key. In some embodiments, the data store also may return a timestamp that specifies the latest modification time of the definition.

Input DEO Query control 440 allows a user to find a set or collection of DEOs that match a search parameter(s) (e.g., DEOs that represent at least one input of a specified service) and display them in work display area 405. For example, upon activation of Input DEO Query control 440, the system may prompt the user for the name and/or unique ID of the service (or generate the unique ID from the name), and then use the name or unique ID (e.g. $S_i$) to retrieve information reflecting the corresponding input DEO(s) from a data store, such as DEO data store 350.

In some particular embodiments, to determine $I(S_i)$, which is the set of DEO(s) that represent the input of service $S_i$, the system may compute the data store key for $I(S_i)$, such as $H(H(S_i))$, which is used to retrieve the appropriate set of input DEO(s) (and which was previously used by the system to store the set of input DEO(s) when they were associated with service $S_i$). In some such embodiments, the query may return a collection of DEO ids and a timestamp that tells the last time each DEO was associated with $S_i$, which are displayed in work display area 405. In other embodiments, the DEO definitions may be returned.

Output DEO Query control 445 allows a user to find a set or collection of DEOs that match a search parameter(s) (e.g., DEOs that represent at least one output of a specified service) and display them in work display area 405. For example, upon activation of Output DEO Query control 445, the system may prompt the user for the name and/or unique ID of the service (or generate the unique ID from the name), and then use the name or unique ID (e.g. $S_i$) to retrieve information reflecting the corresponding output DEO(s) from a data store, such as DEO data store 350.

In some particular embodiments, to determine $O(S_i)$, which is the set of DEO(s) that represent the output of service $S_i$, the system may compute the data store key for $O(S_i)$, such as $H(H(H(S_i)))$, which is used to retrieve the appropriate set of output DEO(s) (and which was previously used by the system to store the set of output DEO(s) when they were associated with service $S_i$). In some such embodiments, the query may return a collection of DEO ids and a timestamp that tells the last time each DEO was associated with $S_i$, which are displayed in work display area 405. In other embodiments, the DEO definitions may be returned.

Services Compose Query control 450 allows a user to determine whether two or more service can be composed or connected to each other, and display the result in work display area 405. For example, upon activation of Services Compose Query control 450, the system may prompt the user for the names and/or unique IDs of at least two services that the user wishes to form into a composite service, and then use the names or unique IDs (e.g., $S_i$ and $S_j$) to retrieve information from a data store, (such as DEO data store 350) reflecting whether at least one DEO exists that maps to an output (input) of $S_i$ and to an input (output) of $S_j$.

In some particular embodiments, to determine if $S_i$ and $S_j$ can be composed, the system performs computations to determine whether $O(S_i) \cap I(S_j) \neq 0$; i.e., to determine if $S_i$'s output can be represented by at least one DEO that also represents $S_j$'s input. In some such embodiments, the system first retrieves $O(S_i)$ and $I(S_j)$ from a data store, which returns a collection of output DEO IDs corresponding to $S_i$ and a collection of input DEO IDs corresponding to $S_j$. Then, for each DEO in $O(S_i)$ (or $I(S_j)$ if it has less elements), the system determines whether the same DEO exists in $I(S_j)$ (or $O(S_i)$)— i.e. determines which DEOs in $O(S_i)$ match a DEO in $I(S_j)$. In certain embodiments, this determination can be done in $O(n)$ time if the collections are represented as hash tables. The system adds each matching DEO, if any, to a list of matches, which may be displayed in work display area 405. In some embodiments, if the timestamp associated with a DEO in the list is newer than the timestamp in $O(S_i)$ and $I(S_j)$, then the matching step can be skipped.

Services Per DEO Query control 455 allows a user to determine what service(s) are associated to a particular DEO, and display the appropriate service(s) in work display area 405. In various embodiments, this control may be useful for garbage collection of useless DEOs, measuring the relevance of a DEO, and the like. For example, upon activation of Services Per DEO Query control 455, the system may prompt the user for the name and/or unique ID of the DEO (or generate the unique ID from the name), and then use the name or unique ID (e.g. $D_j$) to retrieve information reflecting the service(s) that are associated with the DEO from a data store, such as DEO data store 350.

The processing for the Input DEO query control 440 and the Input DEO query control 445 illustrates embodiments that discover the DEOs associated to a particular service. In typical usage of the system, the number of DEOs associated to a single service may be small, while on the other hand, the number of services associated to a single DEO may be large. Accordingly, some embodiments provide two techniques for a user to determine the services that are represented by a DEO: (1) techniques that determine and provide the list of services associated with a DEO $D_j$ and (2) techniques that determine and provide information indicating whether a specified service $S_i$ and a specified DEO $D_j$ are related.

Services Per DEO Query control 455 provides one exemplary implementation of the former technique. In some particular embodiments, Services Per DEO Query control 455 causes the system to determine the key used to query the data store for the list of services associated with a DEO $D_j$, computed as $H(H(D_j))$. In various embodiments, this query may return a timestamp of last modification, an integer representing number of blocks, and a first block, wherein such embodiments divide the list of services into blocks of equal size. If there are multiple blocks, the system queries for subsequent blocks using H(concatenate(H($D_j$)|i)) as the key, where i is the block index and is greater than 0 as the first block (i=0) is returned by the first query.

In such embodiments, to determine if $S_i$ is associated to $D_j$, the system may perform a query using H(concatenate (K($D_j$)|K($S_i$))) as the key, and the returned value may an indicator of association, for example, a timestamp or yes/no binary indicator. If the data store cannot find a value for this key (e.g., the query returns null or some other non-success indicator), then there is no association between $S_i$ and $D_j$.

As with all the descriptions of queries in this disclosure, the values retrieved by queries were previously stored in the data store at locations determined by the same keys that are later used to retrieve the values, for instance, upon activation of controls 430-455.

Services to DEO Mapping Query control 460 allows a user to find and display associations or mappings between service(s) and DEO(s) in work display area 405. For example, upon activation of Service Definition Query control 430, the system may prompt the user for the name and/or unique ID of a service and/or DEO (or generate the unique ID from the name), and then use the names or unique IDs (e.g. $S_i$ and $D_j$) to retrieve information from a data store, such as DEO data store 350, describing the mapping or association between the specified DEO $D_j$ and inputs/outputs of the specified service $S_i$.

In some particular embodiments, the system first determines whether the specified DEO represents the output or input of the specified service. The processing described with respect to the Services Per DEO Query control 455, the Input DEO query control 440, and the Input DEO query control 445 illustrates embodiments that determines whether a specified DEO represents the output or input of a specified service. Using such processing, the system may determine whether a DEO $D_j$ is associated with or mapped to the service $S_i$, and whether the DEO $D_j$ is in O($S_i$) or in I($S_i$). Next, the system may query the mapping definition, e.g., by using H(concatenate(K($S_i$), K($D_j$), "I") as the key for a DEO in I($S_i$), or H(concatenate(K($S_i$), K($D_j$), "O")) for a DEO in O($S_i$). The returned information or values from the query will contain the mapping between attributes, which were stored previously using the same key, for example when the mapping was created.

In various embodiments, as with the other query commands or controls, the returned information from the Services to DEO Mapping Query control 460 may be displayed to the user in work display area 405. For instance, continuing the previous examples presented above, activating the Services to DEO Mapping Query control 460 and providing as inputs information identifying the "Weather Service" service and the "DailyWeather" DEO may cause the system to retrieve or fetch and display in work display area 405 mapping information such as:

---

DailyWeather.maximumTemperature ← →
    WeatherForecasts.Details.WeatherData.MaxTemperatureF
DailyWeather.minimumTemperature ← →
    WeatherForecasts.Details.WeatherData.MinTemperatureF
        DailyWeather.metric ← → "Fahrenheit"

---

In some embodiments, the same information may be alternatively or simultaneously displayed in a graphical format, similar to the graphical format shown in FIG. 1 or FIG. 5. Other types of graphical or non-graphical displays may also be used.

Compose and Execute control 465 allows a user to build workflows and generate orchestration code in work display area 405, and execute the code. In various embodiments, Compose and Execute control 465 may invoke a service execution module, (e.g., a module of DEO execution engine 330), which calls the services which a user has composed or interconnected and passes data from one service to another during execution according to service-to-deo-to-service mappings or associations, as described in this disclosure.

For example, the system may display a composition web service in the work display area 405, for example as shown in FIG. 1, and upon activation of the Compose and Execute control 465 may execute the Get_Product_Details service 110, pass its outputs 114 and 116 to the corresponding inputs 132 and 133 of Currency_Converter service 130 as mapped according to Money DEO 120, and provide information from the outputs 137 and 138 of Currency_Converter service 130 to the user.

One of ordinary skill will recognize that the exemplary user interface shown in FIG. 4 is necessarily simplified for conciseness and clarity of explanation, and that information and controls may be added, removed, rearranged or presented differently without departing from the scope of the invention.

Figure 6:
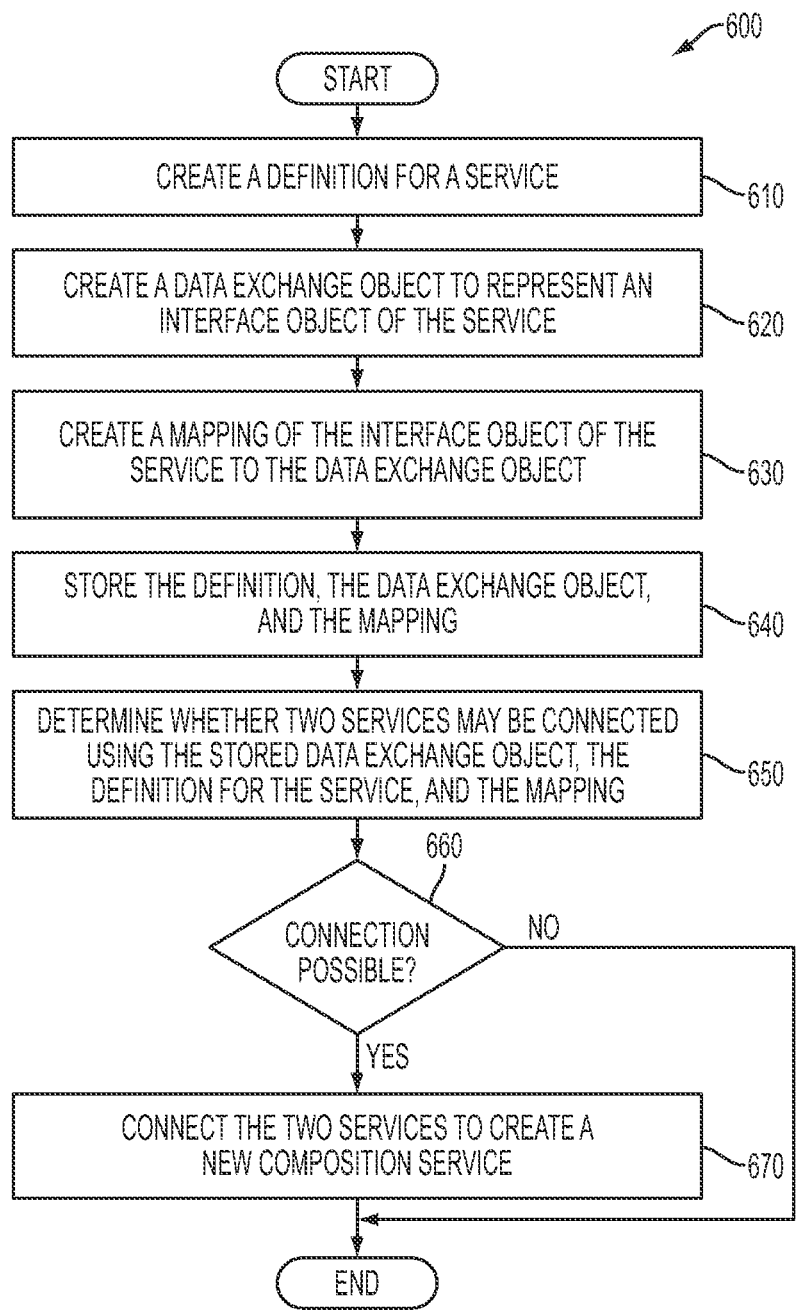
FIG. 6 is a flowchart of an exemplary process for connecting services, consistent with embodiments of the invention.

FIG. 6 is a flowchart of an exemplary process 600 for connecting services, consistent with embodiments of the invention. In various embodiments, process 600 may implemented in software executing on a processor, such as the processors of DEO execution engine 330, computer 320 and/or DEO data manager 340, in hardware, or in a combination of the two.

As shown in the example of FIG. 6, process 600 begins with creating a definition for a service (stage 610). For example, in some embodiments, a user, such as user 310, may define a service using a graphical composition tool executing as a client on computer 320, and DEO execution engine 330, functioning as a server, may create the service definition.

Next, process 600 creates a data exchange object (i.e., DEO) to represent an interface object, such as an output data object or an input data object, of a service (stage 620), for example, the service whose definition was created in stage 610. For example, in some embodiments, user 310 may define a DEO using a graphical composition tool executing as a client on computer 320, and DEO execution engine 330, functioning as a server, may create the DEO definition.

In stage 630, process 600 creates a mapping of the interface object of the service to the DEO. For example, in some embodiments, user 310 may define a mapping or association using a graphical composition tool executing as a client on computer 320, and DEO execution engine 330, functioning as a server, may create the data representing the mapping.

At stage 640, process 600 stores the service definition, the data exchange object, and the mapping. For example, in various embodiments, DEO execution engine 330 may store the service definition in DEO data store 350, which is managed by DEO data manager 340. In various embodiments, DEO execution engine 330 may also store the DEO definition in DEO data store 350, which is managed by DEO data manager 340. In various embodiments, the service definition and/or the DEO definition may be stored according to a key based on a unique ID of the service, for example, as described previously. In various embodiments, DEO execution engine 330 may also store the mapping data in DEO data store 350, which is managed by DEO data manager 340. In some embodiments, the mapping may be stored according to a key based on a unique ID of the DEO, for example, as described previously. In other embodiments, the mapping may be stored as part of a service definition and/or a DEO definition.

Process 600 then determines whether two services may be connected using the stored DEO definition, the services' definitions, and the mapping (stage 650). For example, in some embodiments, DEO execution engine 330 may execute code to implement the functionality described previously with respect to the Services Compose Query control 450, and provide to user 310 via computer 320 an indication of whether two services may be connected to form a composite service.

At stage 660, process 600 branches based on whether or not the two services may be connected (e.g., whether the two services are composable). If the services cannot be connected (stage 660, No), then process 600 ends. If, on the other hand, the two services can be connected (e.g., an output(s) of one service map to a DEO that maps to an input(s) of the other service), the process 600 proceeds to stage 670.

At stage 670, process 600 connects the two services to create a new composition service. For example, in some embodiments, DEO execution engine 330 may execute code to implement the functionality described previously with respect to Compose and Execute control 465, and provide to user 310 via computer 320 prompts for input data required by the composition service and data representing the output data produced by the composite service.

One of ordinary skill will recognize that stages may be added to, deleted from, modified, or reordered in process 600 without departing from the scope of the invention. For example, stage 640 may be combined with each of stages 610-630 to store definitions and mappings as they are created. For another example, stage 670 may be eliminated, for example, in situations where a user does not want to execute the composition service.

Figure 7:
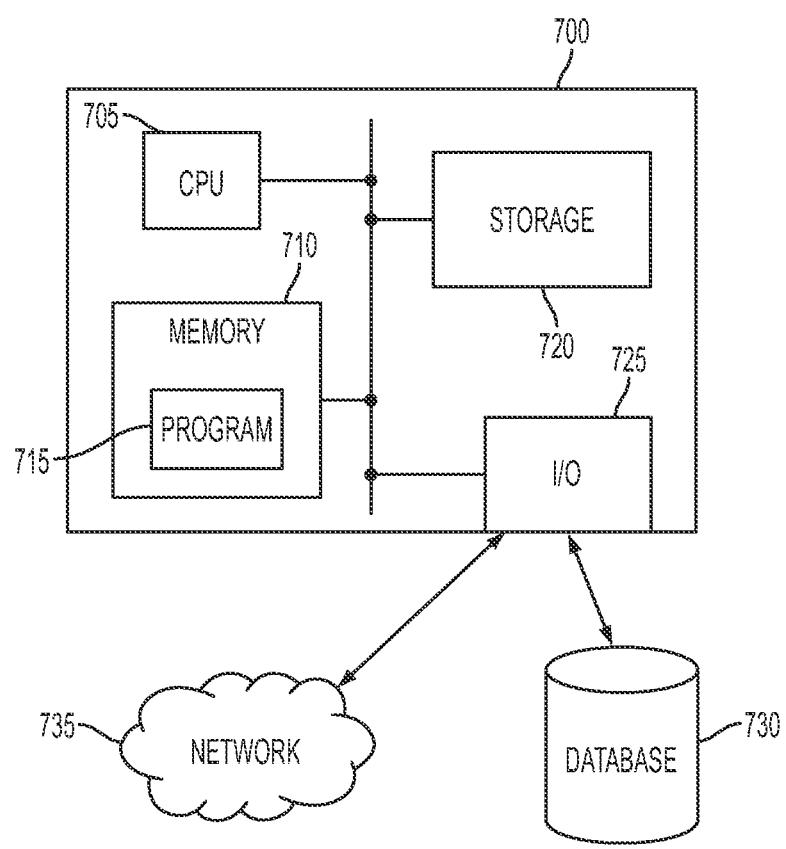
FIG. 7 is a block diagram of an exemplary computing or data processing system that may be used to implement embodiments consistent with the invention.

FIG. 7 is a block diagram of an exemplary computing system or data processing system 700 that may be used to implement embodiments consistent with the invention. Other components and/or arrangements may also be used. In some embodiments, computing system 700 may be used to implement a DEO execution engine 330 and/or a DEO data manager 340 and/or a graphical composition tool 320.

Computing system 700 includes a number of components, such as a central processing unit (CPU) 705, a memory 710, an input/output (I/O) device(s) 725, and a nonvolatile storage device 720. System 700 can be implemented in various ways. For example, an implementation as an integrated platform (such as a workstation, server, personal computer, laptop, smart phone, etc.) may comprise CPU 705, memory 710, nonvolatile storage 720, and I/O devices 725. In such a configuration, components 705, 710, 720, and 725 may connect and communicate through a local data bus and may access a database 730 (implemented, for example, as a separate database system) via an external I/O connection. I/O component(s) 725 may connect to external devices through a direct communication link (e.g., a hardwired or local wifi connection), through a network, such as a local area network (LAN) or a wide area network (WAN), and/or through other suitable connections. System 700 may be standalone or it may be a subsystem of a larger system.

CPU 705 may be one or more known processing devices, such as a microprocessor from the Core™ 2 family manufactured by the Intel™ Corporation of Santa Clara, Calif. Memory 710 may be one or more fast storage devices configured to store instructions and information used by CPU 705 to perform certain functions, methods, and processes related to embodiments of the present invention. Storage 720 may be a volatile or non-volatile, magnetic, semiconductor, tape, optical, or other type of storage device or computer-readable storage medium, including devices such as CDs and DVDs, meant for long-term storage.

In the illustrated embodiment, memory 710 contains one or more programs or subprograms 715 loaded from storage 720 or from a remote system (not shown) that, when executed by CPU 705, perform various operations, procedures, processes, or methods consistent with the present invention. Alternatively, CPU 705 may execute one or more programs located remotely from system 700. For example, system 700 may access one or more remote programs via network 735 that, when executed, perform functions and processes related to or implementing embodiments of the present invention.

In one embodiment, memory 710 may include a program(s) 715 that implements a web services connection application, including implementing process 700 and user interface displays as shown in FIGS. 4 and 5 and/or a program 715 that implements a DEO execution engine 330. In some embodiments, memory 710 may also include other programs or applications that implement other methods and processes that provide ancillary functionality to the invention. For example, memory 710 may include programs that gather from various sources, organize, store, and/or generate web services data used by DEO execution engine 330, and programs that communicate with other systems, such as DEO data manager 340.

Memory 710 may be also be configured with other programs (not shown) unrelated to the invention and/or an operating system (not shown) that performs several functions well known in the art when executed by CPU 705. By way of example, the operating system may be Microsoft Windows™, Unix™, Linux™, an Apple Computers™ operating system, Personal Digital Assistant operating system such as Microsoft CE™, or other operating system. The choice of operating system, and even to the use of an operating system, is not critical to the invention.

I/O device(s) 725 may comprise one or more input/output devices that allow data to be received and/or transmitted by system 700. For example, I/O device 725 may include one or more input devices, such as a keyboard, touch screen, mouse, and the like, that enable data to be input from an administrative user, such as a system operator. Further, I/O device 725 may include one or more output devices, such as a display screen, CRT monitor, LCD monitor, plasma display, printer, speaker devices, and the like, that enable data to be output or presented to a user, such as user 310. I/O device 725 may also include one or more digital and/or analog communication input/output devices that allow computing system 700 to communicate, for example, digitally, with other machines and devices. Other configurations and/or numbers of input and/or output devices may be incorporated in I/O device 725.

In the embodiment shown, system 700 is connected to a network 735 (such as the Internet, a private network, a virtual private network, or other network, which may include network 360 of FIG. 3), which may in turn be connected to various systems (e.g., DEO data manager 340) and computing machines (not shown in FIG. 7), such as personal computers, laptop computers 320, and/or smart phones of users 310 who wish to utilize DEO execution engine 330. In general, system 700 may input data from external machines and devices and output data to external machines and devices via network 735.

In the exemplary embodiment shown in FIG. 7, database 730 is a standalone database external to system 700. In other embodiments, database 730 may be hosted by system 700. In various embodiments, database 730 may manage and store data used to implement systems and methods consistent with the invention. For example, database 730 may implement DEO data store 350 and/or manage and store data structures such as data structure 220, which contain service, DEO, and mapping data used by DEO execution engine 330, graphical composition tool 320, or user interface displays, such as those illustrated in FIGS. 4-5.

Database 730 may comprise one or more databases that store information and are accessed and/or managed through system 700. By way of example, database 730 may be an Oracle™ database, a Sybase™ database, or other relational database. Systems and methods consistent with the invention, however, are not limited to separate data structures or databases, or even to the use of a database or data structure.

The above disclosure provides examples of systems and methods for composing compound services by the aggregation and connecting of other existing services. In various embodiments, the connections between service are made and/or represented through use of abstract intermediate object types referred to as data exchange objects (DEOs) that represent the data objects that are exchanged between services. Various embodiments provide a user with the ability to determine the validity of a connection by testing whether the outputs of one service (in whole or in part) can be mapped to a particular DEO, and that same DEO can be mapped to one of the possible inputs (in whole or in part) of a second service. Where two or more services can be connected, they compose a new compound service. In various embodiments, the systems and methods include functionality to perform queries returning the inputs/outputs of DEOs, to test whether two DEOs can be connected, and to compose the new service.

It will be apparent to those skilled in the art that various modifications and variations can be made to the structures and methodologies described herein. Thus, it should be understood that the invention is not limited to the examples discussed in the specification. Rather, the present invention is intended to cover modifications and variations.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims. Moreover, the claims can encompass embodiments in hardware, software, or a combination thereof.

What is claimed is:

1. A method, implemented using a computing system, for composing compound services, the method comprising:

creating, using an electronic processor, a first definition of a first service, the first service including a first interface object, wherein the first definition of the first service is service independent and comprises a pseudocode representation;

creating, using an electronic processor, a data exchange object that represents the first interface object of the first service, wherein the data exchange object comprises a pseudocode representation;

creating, using an electronic processor, an association between the first interface object of the first service with the data exchange object, wherein creating the association between the first interface object of the first service with the data exchange object comprises creating the association when the first interface object of the first service is syntactically compatible with the data exchange object and is semantically compatible with the data exchange object;

storing, using an electronic processor, the data exchange object, wherein the storing the data exchange object comprises storing the association between the first interface object of the first service with the data exchange object as part of the data exchange object itself;

creating, using an electronic processor, a second definition of a second service, the second service including a second interface object, wherein the second definition of the second service comprises a pseudocode representation;

determining, using an electronic processor, that the second interface object associates to the data exchange object;

connecting, using an electronic processor, the second service to the first service through the data exchange object, wherein an output of the first service connects to an input of the data exchange object, and wherein an output of the data exchange object connects to an input of the second service;

storing, using an electronic processor, the first definition;

providing, using an electronic processor, to a user, access to the first definition, the data exchange object, and the association;

receiving a user request to identify data exchange objects that are associated with a service, including data that identifies the first service; and identifying the data exchange object in response to the request.

2. The method of claim 1, further comprising:
indicating, to the user, that the second service is connectable to the first service.

3. The method of claim 1, further comprising:
receiving a request to identify services that are associated with a data exchange object, including data that identifies a first data exchange object; and
identifying the first service in response to the request.

4. A system for composing compound services, the system comprising:

a memory containing instructions; and a processor, operably connected to the memory, that executes the instructions to perform operations comprising:

creating a first definition of a first service, the first service including a first interface object, wherein the first definition of the first service is service independent and comprises a pseudocode representation, creating a data exchange object that represents the first interface object of the first service, wherein the data exchange object comprises a pseudocode representation, creating an association between the first interface object of the first service with the data exchange object, wherein creating the association between the first interface object of the first service with the data exchange object comprises creating the association when the first interface object of the first service is syntactically compatible with the data exchange object and is semantically compatible with the data exchange object;

storing, using an electronic processor, the data exchange object, wherein the storing the data exchange object comprises storing the association between the first interface object of the first service with the data exchange object as part of the data exchange object itself;

creating a second definition of a second service, the second service including a second interface object, wherein the second definition of the second service comprises a pseudocode representation, determining that the second interface object associates to the data exchange object, connecting the second service to the first service through the data exchange object, wherein an output of the first service connects to an input of the data exchange object, and wherein an output of the data exchange object connects to an input of the second service, storing the first definition, providing, to a user, access to the first definition, the data exchange object, and the association;

receiving a user request to identify data exchange objects that are associated with a service, including data that identifies the first service; and identifying the data exchange object in response to the request.

5. The system of claim 4, the operations further comprising:
indicating, to the user, that the second service is connectable to the first service.

6. The system of claim 4, the operations further comprising:
receiving a request to identify services that are associated with a data exchange object, including data that identifies a first data exchange object; and
identifying the first service in response to the request.

7. A non-transitory computer-readable medium containing instructions that when executed implement a method comprising:

creating a first definition of a first service, the first service including a first interface object, wherein the first definition of the first service is service independent and comprises a pseudocode representation;

creating a data exchange object that represents the first interface object of the first service, wherein the data exchange object comprises a pseudocode representation;

creating an association between the first interface object of the first service with the data exchange object; wherein creating the association between the first interface object of the first service with the data exchange object comprises creating the association when the first interface object of the first service is syntactically compatible with the data exchange object and is semantically compatible with the data exchange object;

storing, using an electronic processor, the data exchange object, wherein the storing the data exchange object comprises storing the association between the first interface object of the first service with the data exchange object as part of the data exchange object itself;

creating a second definition of a second service, the second service including a second interface object;

determining that the second interface object associates to the data exchange object;

connecting the second service to the first service through the data exchange object, wherein an output of the first service connects to an input of the data exchange object, and wherein an output of the data exchange object connects to an input of the second service;

storing the first definition;

providing, to a user, access to the first definition, the data exchange object, and the association;

receiving a user request to identify data exchange objects that are associated with a service, including data that identifies the first service; and identifying the data exchange object in response to the request.

8. The non-transitory computer-readable medium of claim 7, further comprising instructions for:
indicating, to the user, that the second service is connectable to the first service.

9. The non-transitory computer-readable medium of claim 7, further comprising instructions for:
receiving a request to identify services that are associated with a data exchange object, including data that identifies a first data exchange object; and
identifying the first service in response to the request.

* * * * *